United States Patent
Beardsley et al.

(10) Patent No.: US 9,393,697 B1
(45) Date of Patent: Jul. 19, 2016

(54) SYSTEM AND METHOD USING FOOT RECOGNITION TO CREATE A CUSTOMIZED GUEST EXPERIENCE

(71) Applicant: Disney Enterprises, Inc., Burbank, CA (US)

(72) Inventors: Paul Beardsley, Zurich (CH); Aparna Taneja, Zurich (CH)

(73) Assignee: DISNEY ENTERPRISES, INC, Burbank, CA (US)

( * ) Notice: Subject to any disclaimer, the term of this patent is extended or adjusted under 35 U.S.C. 154(b) by 0 days.

(21) Appl. No.: 14/677,486

(22) Filed: Apr. 2, 2015

(51) Int. Cl.
  *B25J 13/08* (2006.01)
  *B25J 11/00* (2006.01)
  *B25J 19/02* (2006.01)
  *H04N 5/232* (2006.01)
  *G06T 1/00* (2006.01)

(52) U.S. Cl.
  CPC ............ *B25J 11/0005* (2013.01); *B25J 19/021* (2013.01); *G06T 1/0014* (2013.01); *H04N 5/23222* (2013.01); *H04N 5/23229* (2013.01); *Y10S 901/01* (2013.01); *Y10S 901/47* (2013.01)

(58) Field of Classification Search
  CPC ... B25J 11/0005; B25J 19/021; G06T 1/0014; H04N 5/2322; H04N 5/23229
  USPC .......................................................... 701/28
  See application file for complete search history.

(56) References Cited

U.S. PATENT DOCUMENTS

| | | | | |
|---|---|---|---|---|
| 6,729,934 | B1* | 5/2004 | Driscoll | A63H 3/28 340/10.41 |
| 7,837,567 | B2* | 11/2010 | Holzberg | A63G 31/00 463/42 |
| 8,982,110 | B2* | 3/2015 | Saban | H04N 1/622 345/204 |
| 2005/0070258 | A1* | 3/2005 | Stanco | H04W 4/02 455/414.1 |
| 2009/0234666 | A1* | 9/2009 | Crawford | A63G 1/00 705/301 |

OTHER PUBLICATIONS

Beardsley, Paul et al., "Image-Based Reconstruction and Synthesis of Dense Foliage", Jul. 22, 2013.
Richter, Stephan R. et al., "Bootstrapper: Recognizing Tabletop Users by their Shoes", CHI '12, May 5-10, 2012, Austin, Texas.

\* cited by examiner

*Primary Examiner* — Behrang Badii
*Assistant Examiner* — Michael Berns
(74) *Attorney, Agent, or Firm* — Dorsey & Whitney LLP

(57) ABSTRACT

The present disclosure discloses a system and method for creating a customized guest experience at an amusement park. In one example, the method includes capturing by a foot sensor a first foot shape corresponding to at least one foot in a pair of feet of a guest and capturing by a camera a first foot appearance corresponding to at least one foot in the first pair of feet receiving guest data from the guest. The method also includes generating a first foot model using the first foot shape and the first foot appearance and tagging the first foot model with the guest data. The foot model can be used to identify a particular guest and the guest data can be used to output a customized guest experience to the guest.

25 Claims, 6 Drawing Sheets

US 9,393,697 B1

SYSTEM AND METHOD USING FOOT RECOGNITION TO CREATE A CUSTOMIZED GUEST EXPERIENCE

TECHNICAL FIELD

The present invention relates generally to customizing interactions for guests of a theme park using foot recognition.

BACKGROUND

In some environments, such as amusement parks, theme parks, sporting events, and other entertainment venues it may be desirable to acquire and reacquire guests in a predetermined area (e.g., the venue grounds). For example, acquiring and reacquiring guests at different locations in the amusement park can provide data to the amusement park owners, such as the most popular rides, common guest paths from ride to ride. Additionally, recognizing individual guests or providing a method for an individual to register at certain rides or other attractions allows the amusement park to tailor certain experiences for the guest, such as creating a customized media output (e.g., photograph) directed to the particular guest.

Current methods for acquiring guest information and subsequently matching a particular guest with the acquired guest information are limited to rather invasive methods, such as retinal and fingerprint identification methods. These methods are obtrusive and some guests may not feel comfortable providing this type of biometric information to a third party. Further, these types of methods may not work when guests are wearing certain accessories such as hats or sunglasses. Less invasive manners, such as comparing a user's clothing or the like, can produce inaccurate results as many guests may have similar clothing or may change clothing, such putting on or taking off an outer layer or sweater, which can make detection unreliable.

SUMMARY

One embodiment of the present disclosure includes a system and method for creating a customized guest experience at an amusement park. In one example, the method includes capturing, by a foot sensor, a first foot shape corresponding to at least one foot in a pair of feet of a guest and capturing, by a camera, a first foot appearance corresponding to at least one foot in the first pair of feet receiving guest data from the guest. The method also includes generating a first foot model using the first foot shape and the first foot appearance and tagging the first foot model with the guest data. The foot model can be used to identify a particular guest and the guest data can be used to output a customized guest experience to the guest.

Another embodiment includes a system for enrolling and acquiring guests in a venue. The system includes at least one acquisition station including a foot sensor and a camera and a computing device in communication with the at least one acquisition station. The computing device performs the following operations: receive a first set of foot data from the foot sensor and the camera of the at least one acquisition station, wherein the first set of foot data includes data corresponding to both a foot shape and a foot appearance; generate a first foot model using the first set of foot data, wherein the first foot model corresponds to a first person; and store the first foot model in a database.

Still another embodiment includes a robot for interacting with guests at an amusement park. The robot includes a foot sensor for capturing a depth image of at least one foot of a guest and a camera for capturing a color image of the least one foot of the guest. The robot may also include a movement mechanism allowing the robot to roam the amusement park or a portion thereof and an input/output interface for receiving guest information from the guest.

SPECIFICATION

The present disclosure is related generally to an acquisition and reacquisition system for people. The acquisition and reacquisition system may be implemented in a number of different applications, such as amusement parks, theme parks, sporting arenas, convention centers, and the like, to allow guest awareness of a particular individual through various locations and/or at discrete times within the entertainment venue. The acquisition and reacquisition system includes a foot detecting system that detects using both depth and color images of various characteristics of a person's foot, shoe, and/or bottom portion of one or both of the person's legs.

Once the foot characteristics are acquired, the system creates a foot descriptor, such as a foot model of the individual's foot and stores the foot descriptor, along with any additional individual information (e.g., name, interests, hometown, etc.), in a database. As the individual moves throughout the entertainment venue, a reacquisition detecting system detects one or more various characteristics of the individual's foot, shoe, and/or leg and attempts to match the foot characteristics with a pre-stored or previously acquired individual. When a match is detected, the system provides an output to provide a customized or tailored experience for the guest.

As the acquisition and reacquisition system determines guest awareness by people's feet, the identification sensors can be implemented towards the ground, out of a person's line of sight. This allows the system to unobtrusively capture the foot information from the person, especially as compared to facial recognition systems that require a user to stare directly towards the sensor, as well as other guest recognition systems that identify a person based on overall clothing as those systems require cameras that are visible to the person. Further, as the identification sensors of the present disclosure are angled towards the ground, the background surrounding the person's feet is often easier to identify and account for when extracting the foot information from the sensor data. Finally, shoe styles typically vary widely in appearance and color, helping to reduce confusion for the system in identifying a particular person and in instances where two people have the same or similar shoes, the system can also use additional information, such as lower leg data, tread wear, or foot size.

Figure 1:
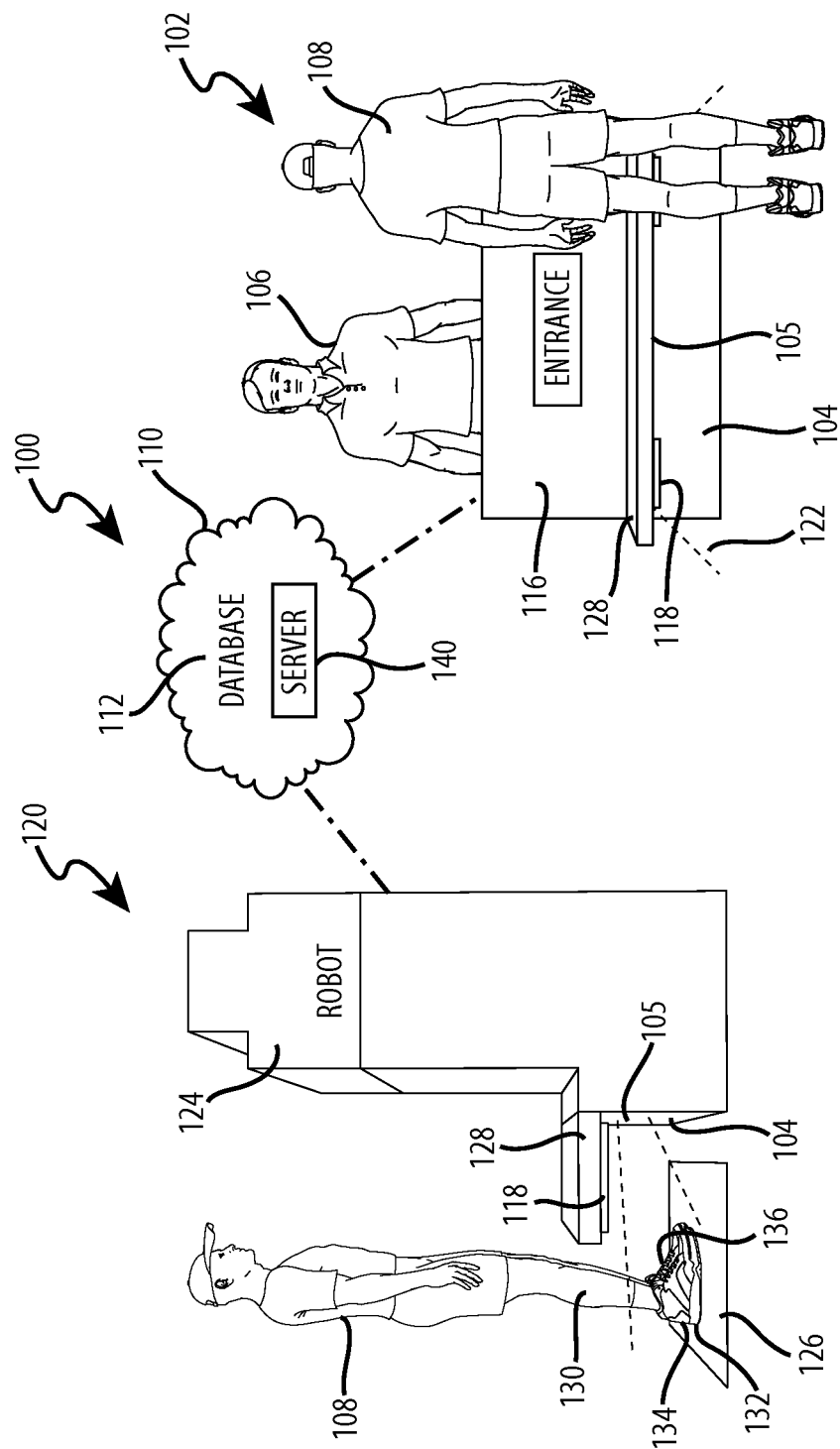
FIG. 1 is a diagram of an acquisition and reacquisition system that can be used to acquire and reacquire guests through a venue and provide a customized guest experience to one or more guests.

FIG. 1 illustrates an acquisition and reacquisition system 100 of the present disclosure for guest awareness within a theme park. As shown in FIG. 1, the acquisition and reacquisition system 100 includes a first acquisition station 102 and a second acquisition station 120, each of which are in communication with a database 112 including one or more servers 140 via a network 110. The two acquisition stations 102, 120 may each be used for acquisition and/or reacquisition of people or alternatively the stations 102, 120 may be specialized, i.e., one station is an acquisition station and the other station is a reacquisition station. Thus, although referred to an acquisition station herein, the stations may be used for reacquisition and/or acquisition. The term acquisition is meant to encompass both an initial acquiring of guest data, as well as subsequent acquisition steps used for the reacquisition process. Additionally, it should be appreciated that although two stations 102, 120 are illustrated, a single dual-purpose station or multiple single-purpose or dual-purpose stations may be used with the system 100.

The stations 102, 120 may be standalone stations that are movable on their own or may be incorporated into other structures. As one example, the stations 102, 120 may be movable robots that move through various areas of the amusement park. As another example, the stations 102, 120 may be incorporated into a ride or attraction, e.g., positioned in a ride vehicle, incorporated into a wall, or the like.

Depending on whether the stations 102, 120 are dual purpose or single purpose, as well other factors, the stations 102, 120 may be substantially the same as one another or may include similar components. However, in addition to including many similar components, the stations 102, 120 may also include different components from one another that may be tailored to specific functions for each of the stations 102, 120 or modified based on a desired location of the station, or the like. As such, although the below discussion is made with respect to each station 102, 120 being substantially the same, it should be understood that this is for ease of discussion only and many other configurations are envisioned.

Figure 2:
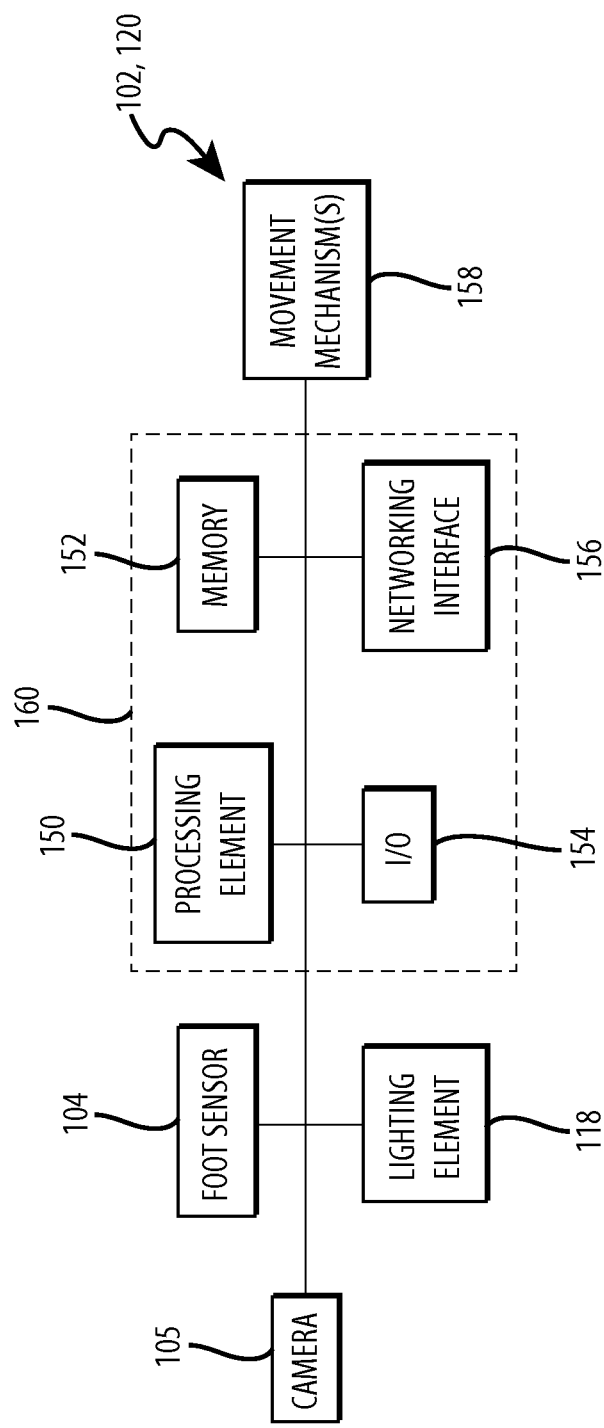
FIG. 2 is a simplified block diagram of an acquisition station of the system of FIG. 1.

FIG. 2 illustrates a simplified block diagram of the stations 102, 120. With reference to FIGS. 1 and 2, each station 102, 120 in this embodiment includes a foot sensor 104, a camera 105, a sensor mount 116, a lighting mount 128, one or more lighting elements 118, a movement mechanism 158, and a computing device 160 including a processing element 150, one or more memory components 152, an input/output interface 154, and a networking interface 156. Optionally, each of the stations 102, 120 may include an interaction host 106, 124, which may be either a person (e.g. amusement park employee) or a robot or a computing device. Each of the components of the stations 102, 120 are in communication with one another, either directly or indirectly, via one or more system buses, wireless means (e.g., Wi-Fi, BLUETOOTH, other radio waves), or the like.

The foot sensor 104 is a depth sensor that detects the distance of various components in an object, such as a shoe. The foot sensor 104 may include one or more depth sensors depending on the desired resolution and accuracy of the foot sensor 104. For example, the foot sensor 104 may include a structured light projector (such as a laser projector) that projects a light pattern onto an object and a camera such as a RGB or monochrome camera that captures the projected light pattern and uses the characteristics of the captured projected light pattern to determine the depth of various features on the object. Examples of these types of depth sensors include the KINECT gaming device produced by Microsoft. As another example, the foot sensor 104 may be a stereo camera system including two or more lenses with respective image sensors.

The camera 105 is an imaging device that captures image data corresponding to one more objects. Typically, the camera 105 captures color images, such as images including red, green, and blue colors. However, in other embodiments, the camera 150 may be configured to capture other types of images, such as monotone, black and white, and so on. The camera 150 is configured to capture the appearance and coloring scheme of a guest's foot.

The ground sensor 126 may also be used to capture foot data of the user. The ground sensor 126 may be similar to the foot sensor 104 or the camera 105 and is used to capture additional foot data such as the tread pattern, wear pattern, stains (e.g., gum stuck on the bottom of the shoe), or the like. The ground sensor 126 is positioned on a bottom floor either adjacent to the acquisition stations 102, 120 or connected to the stations 102, 120.

The lighting element 118 may be mounted on the lighting mount 128 and illuminates a field of view (FOV) 122 for either or both the foot sensor 104 and camera 105. The lighting element 118 is substantially any type of component that can produce light, such as, but not limited to, a light emitting diode, organic light emitting diode, incandescent light, infrared light, fluorescent light, or the like. In some embodiments, the light element 118 illuminates the FOV 122 with a particular set of wavelengths, such as certain colored light wavelengths (e.g., blue, red, or green), which may be used to assist in filtering the foot sensor 104 and camera 105 data.

The movement mechanism 158 is included in embodiments where the stations 102, 120 are movable. For example, with reference to FIG. 1, one or both of the stations 102, 120 may be independently movable so that the sensor mount 116 and other components attached to the station 102, 120 can move from a first position to a second position. As some examples, the movement mechanism 158 may include one or more motors, wheels, a steering or drive element, and so on. The movement mechanism 158 is determined based on the type of movement desired, the size, weight, and shape of the station 102, 120, as well as the ground or surface that the station 102, 120 will be moved on.

The computing device 160 is substantially any type of electronic device, such as, but not limited to, a desk top computer, a server, a laptop computer, a tablet computer, a mobile phone, a smart phone, or the like. Additionally, the computing device 160 may include two or more computing devices in communication with one another, e.g., a laptop in communication with a server. The computing device 160 and the server 140 may include substantially the same types of components, but in many embodiments the server 140 will have an increased processing element 150 and memory 152 to perform many calculations and analysis discussed below. However, in other embodiments, the computing device 160 is configured to perform calculations and analysis related to the acquisition stations 102, 120 and includes sufficient processing power and memory space to do so. As discussed herein the components for the computing device 160 and the processing element 150 are discussed with respect to the computing device 160, but it should be understood that the server 140 may include any of these elements performing similar or the same functions and as such the discussion of the processing element 150 and/or memory 152 as being located in the computing device 160 or server 140 is meant as illustrative only.

The processing element 150 is substantially any electronic device capable of processing, receiving, and/or transmitting instructions. For example, the processing element 150 may be a microprocessor or a central processing unit. As described herein, the term "processing element" is meant to encompass a single processor or processing unit, multiple processors, or multiple processing units, or other suitably configured computing elements. For example, a first processor may control a first set of components of the computing device 160 and a second processor may control a set of components, where the first and second processors may or may not be in communication with each other.

The memory 152 stores electronic data that may be utilized by the computing device 160 and station 102, 120. For example, the memory 120 may store electrical data or content e.g., audio files, video files, document files, and so on, corresponding to various applications. The memory 120 may be, for example, non-volatile storage, a magnetic storage medium, optical storage medium, magneto-optical storage medium, read only memory, random access memory, erasable programmable memory, flash memory, or a combination of one or more types of memory components.

The networking interface 156 is used to communicate data to and from the computing device 160 to other computing devices via the network 110. The networking interface 156 may use wireless and/or wired mechanisms to transmit data. Examples of the networking interface 156 include, but are not limited to, universal serial bus (USB) ports and cables, one or more system buses, Wi-Fi, Internet, BLUETOOTH, or the like. The method and type of data transmission depends on a configuration of the computing device 160, as well as the network 110. In one embodiment, the networking interface 156 may communicate data wireless to the server 140 via the network 110.

With continued reference to FIGS. 1 and 2, the input/output interface 154 of the computing device 160 is configured to receive a user input, as well as to provide output to one more users. The input/output interface 154 may include, for example, a keyboard, mouse, track pad, joystick, touch screen (e.g., capacitive touch screen), stylus, camera, and so on. The input/output interface 154 allows for one or both of a guest and/or interaction user 124 (e.g., employee, character, robot) to provide input to the acquisition system 102.

With reference to FIG. 1 in general, the acquisition stations 102, 120 receive data from a guest 108, including foot data, as well as any additional related guest data such as the guest's name 108, favorite characters, rides, hometown, and so on, and communicates the guest data to database 112 server 140 via the network 110. The database 112 may store not only the guest data, but also shoe data such as a list of shoes or products sold that include character details (e.g., shoes corresponding to a character in a movie) that can be compared with the foot data to provide a customized guest interaction. The server 140 uses the guest data to create a guest profile corresponding to the individual guest 108. During a reacquisition phase, the acquisition stations 102, 120 receive the guest data and transmit the guest data to the server 140 which after creating a guest profile compares the guest profile to other profiles stored thereon and determines whether the guest profile matches that of a previously acquired guest.

Figure 3:
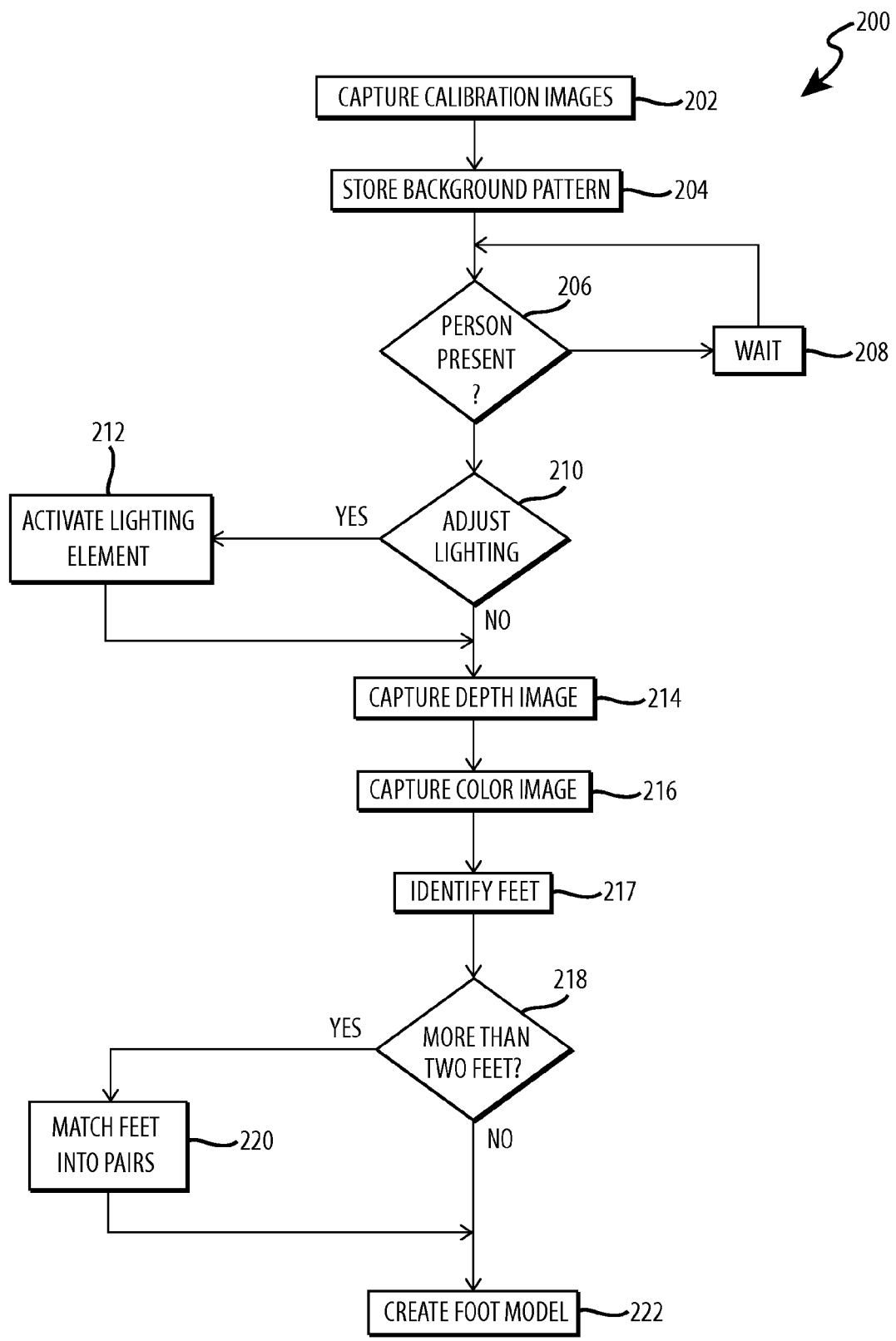
FIG. 3 is a flow chart illustrating a method for enrolling a guest in the system of FIG. 1.

FIG. 3 illustrates a flow chart for a method of capturing the guest data using the acquisition stations 102, 120 that can be used for enrolling a guest. With reference to FIG. 3, the method 200 begins with operation 202 and the camera 105 captures one or more calibration images. The calibration images include an image of any item within the FOV 122 of the camera 105 and/or foot sensor 104. Typically, the calibration images are captured before a guest 108 is positioned in the FOV 122. This allows the system 100 to calibrate the system 100 based on background, environment, and/or lighting aspects for each of the acquisition stations 102, 120. Once the calibration images are captured, the method 200 proceeds to operation 204. In operation 204, the computing device 160 and/or server 140 analyzes the calibration images to extract a background pattern and then stores the background pattern in the memory 152 (either on the computing device 160 or the server 140) as a background model.

With reference to FIG. 3, after operation 204, the method 200 proceeds to operation 206. In operation 206, the processing element 150 determines whether a guest 108 is present within the FOV 122 of the acquisition station 102, 120. For example, the ground sensor 126 may be used to register when a guest 108 is standing in front of the acquisition station 102, 120. In another example, the camera 105 may capture images that may be compared against the background pattern to determine if a guest 108 is present in front of the acquisition station 102, 120. In yet another example, the guest 108 may provide input to the input/output interface 154 to indicate that he or she is located in front of the acquisition station 102, 120. As yet another example, the interaction character 106, 124 enters data via the input/output interface 154 indicating that a guest is present. Other examples include using one or more sensors, such as ambient light sensors, weight sensors, or the like, positioned on or connected to the acquisition station 102, 120 that are used to detect when a guest 108 is present.

When the processing element 150 determines that a guest 108 is not present in operation 206, the method 200 may proceed to an optional wait operation 208. In this operation 208, a wait time, e.g., 10-20 seconds, may be implemented before the method 200 returns to operation 206 to check whether a guest 108 is present again. The wait time can be implemented to reduce power consumption so that the system 100 does not continuously poll sensors to detect if a guest is present. However, in instances where reducing power consumption is not a factor, the wait operation 208 may be omitted.

When the processing element 150 determines that a guest 108 is present, the method 200 proceeds to operation 210. In operation 210 the processing element 150 determines whether the lighting for the FOV 122 should be adjusted. For example, the processing element 150 may analyze one or more images captured by the camera 105 or analyze data from the foot sensor 104 or ambient light sensor to determine whether the lighting is sufficient to allow the guest data to be accurately captured. As an example, when the environment is dark, such as during nighttime, the ambient light may not be sufficient to accurately capture all of the relevant guest data. As another example, the lighting may be adjusted to provide certain color wavelengths to the FOV 122 that enhance certain features of the guest 108, shoes 134, and/or legs 130.

When the processing element 150 determines in operation 210 that the lighting needs to be adjusted, the method 200 proceeds to operation 212 and the lighting element 118 is activated. In these instances, the processing element 150 activates the lighting element 118 to illuminate the FOV 122 in predetermined light wavelengths. When no lighting adjustment is needed, or after the lighting element 118 is activated, the method 200 proceeds to operation 214.

With reference to FIGS. 1 and 3, in operation 214, the foot sensor 104 captures one or more depth images. The depth images include data corresponding to the guest 108, such as, but not limited to, data regarding the feet 132, shoes 134, and/or lower leg 130 of the guest 108. For example, in some embodiments, the foot sensor 104 uses a structured light pattern to determine depth and the foot sensor 104 projects the light pattern onto any objects falling within the FOV 122 of the acquisition stations 102, 120 and captures one or more images of the projected light pattern as it illuminates on the objects within the FOV 122. Variations in the pattern as captured in the depth images are used to evaluate the depth of different components in the FOV 122.

Depending on various factors, such as, but not limited to, resolution, accuracy, background model, and so on, two or more depth images may be captured. For example, to increase accuracy of the foot model for the guest 108, the foot sensor 104 can capture multiple depth images at different instances of time (typically close together in time) and the multiple images can be used to ensure that the foot model is accurate.

As the foot sensor 104 is capturing the depth images, the method 200 proceeds to operation 216 and the camera 105 captures one or more color images. The color images are similar to the depth images in that they capture objects falling within the FOV 122 of the acquisition stations 102, 120. However, the color images may include hue or other color data (e.g., RGB, luminance, brightness), whereas the depth images may or may not include color data. It should be noted that in some embodiments, the foot sensor 104 may capture both the depth and color images. Also, in many embodiments, the depth images and the color images may be captured substantially simultaneously or otherwise close in time to one another to help ensure that the objects in one image correspond to the other image.

Figure 4A:
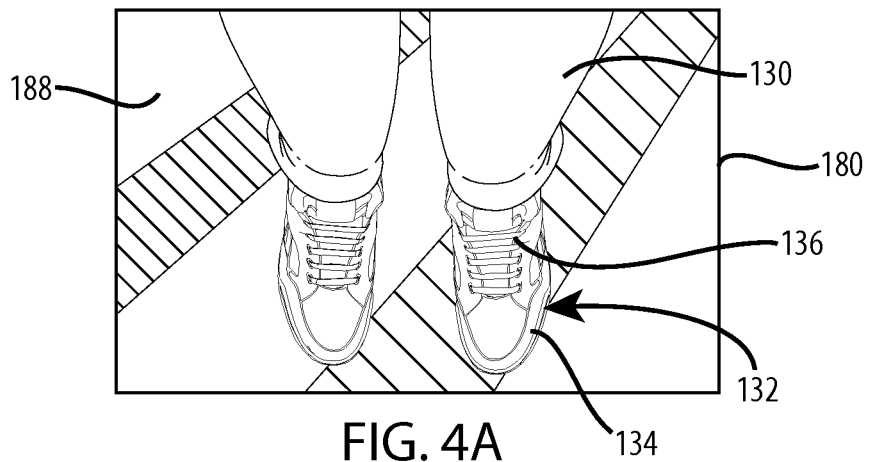
FIG. 4A is an example of a color image (with color removed) captured by the acquisition station of FIG. 2.
Figure 4B:
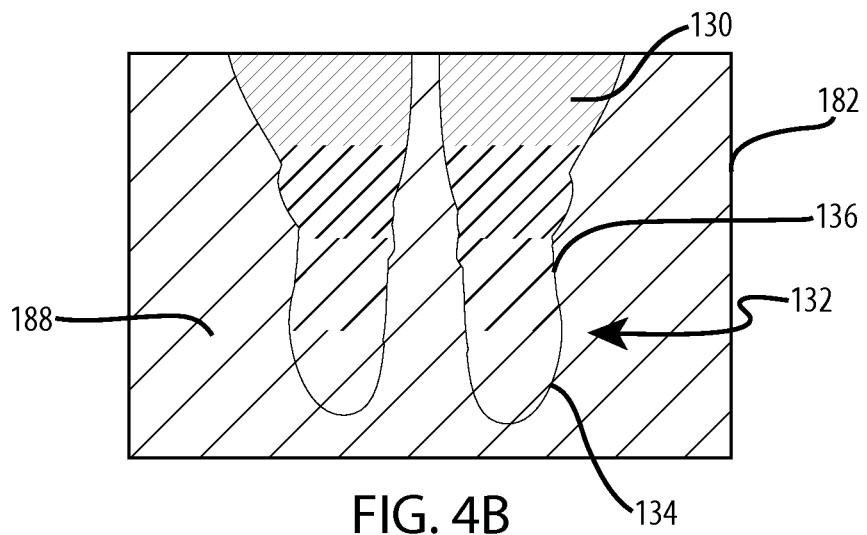
FIG. 4B is an example of a depth image captured by the acquisition station of FIG. 2.

FIG. 4A illustrates an example of a color image with the background information present. FIG. 4B illustrates an example of a depth image. With reference to FIGS. 4A and 4B, the depth image 182 and the color image 180 both include image data related to the feet or foot 132, shoe 134, laces 136, and/or lower leg 130 of the guest 108. The depth image 182 includes depth data corresponding to the depth of various elements for each of the components and the color image 180 includes color data corresponding to the hue, luminance, and other related characteristics of the various elements for each component. It should be noted that due to the reproduction, the color information has been omitted from the color image, but typically will include hue and other information for the image.

Figure 4C:
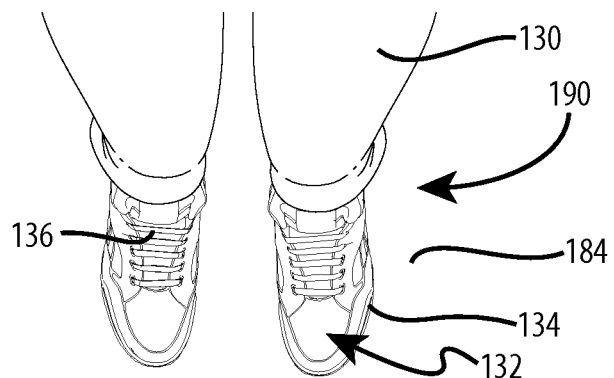
FIG. 4C is an example of the color image of FIG. 4A with the background removed.

With reference again to FIG. 3, once the depth and color images have been captured, the method 200 proceeds to operation 217. In operation 217, the processing element 150 identifies all feet occurring within the color and depth images 180, 182. For example the processing element 150 subtracts the background pattern from the color image 180 and/or the depth image 182 (e.g., by using the calibration images captured in operation 202). FIG. 4C illustrates an example of the color image 180 of FIG. 4A with the background information 188 subtracted. To remove the background information 188, the processing element 150 compares the calibration images captured in operation 202 to the color image 180 and/or the depth image 182 to remove the background information 188. FIG. 4C illustrates an example of the color image 180 of FIG. 4A with the background information 188 removed. As shown in the calibrated color image 190, the background 188 information is removed so that only data corresponding to the guest's 108 leg 130, foot 132, shoe 134, and laces 136 remains.

In one embodiment, in operation 217, the processing element 150 fits a generic three-dimensional (3D) foot shape to the depth image 182 to identify all areas of the image 182 with a similar shape to a foot. The generic 3D foot shape is scalable to account for varying foot sizes of different guests 108. For example, the processing element iteratively identifies occurrences of fits between the foot shape and a dense point cloud representing the objects within the depth image 182. With the iterative method, the point cloud is updated to remove any points assigned to a foot 132.

In another embodiment, in operation 217, the processing element 150 compares a 3D parametric foot model to the depth image 182. In this example, the parametric model encodes the average shape of a foot as well as its modes of variation (e.g., size, shape), which allows the model to more accurately accommodate multiple variations in feet and detect feet within the depth image 182. Equation (1) below illustrates an example of a parametric model that may be used.

$$S_{model} = \overline{S} + \sum_{j=1}^{m-1} \alpha_j s_j \qquad \text{Equation (1)}$$

In Equation (1) above $\overline{S}$ is the average of the m input shapes and $s_j$ are the eigenvectors of the covariance matrix, defining the shape space of the foot.

The parametric 3D model, such as the one shown in Equation (1) may be generated by collecting multiple 3D scans of feet from different people and then analyzing the 3D scans to generate the limitations and inputs for the parametric model. The 3D scans may be completed separately from the method 200 and/or the depth images 182 from multiple guests may be used to update and continuously modify, updated, and/or refine the 3D parametric model.

With reference again to FIG. 3, after operation 217, the method 200 proceeds to operation 218. In operation 218, the processing element 150 and/or server 140 analyzes the depth images 182 and/or color images 180 to determine if more than two feet are present in either the depth or color image. For example, the system 100 may use image analyzing techniques such as, but not limited to, shape and/or color detection for evaluating the depth and/or color image to detect if one or more feet are present. In one embodiment, the processing element 150 compares the size and/or appearance of each of the feet present in the images to match a pair of feet together. For example, a shape model of a typical human foot can be used to detect similar shapes and sizes in the images since most human feet, although they may be different sizes, the approximate shape and size range generally remains the same. Using a shape analysis, the pairs of feet can be determined based on the left and right feet being substantially mirror images of one another. Heuristics or other statistical analysis techniques are used to discard outliers in the images, e.g., bag or purse outlines, etc., so that the bounds of the feet and/or bottom of the legs can be determined. Additionally or alternatively, vertical structure using a color analysis can be used to remove the background to detect the presence of the feet.

When more than two feet are detected, the method 200 proceeds to operation 220. In operation 220, the processing element 150 identifies matching pairs of feet. For example, the processing element 150 may compare the color images 180 and/or depth images 182 to determine which objects in the images correspond to a first pair of feet and which objects correspond to a second pair of feet. For example, the processing element 150 can compare shape, color, size, and so on to determine those feet that substantially match each other in the image. After operation 220 or in instances when only one pair of feet are detected in operation 218 the method 200 proceeds to operation 222 and a foot model is created for the foot pairs captured by the acquisition stations 102, 120. The foot model is a 3D model encoding the shape and appearance of the foot, and/or lower leg of the guest 108.

Figure 5:
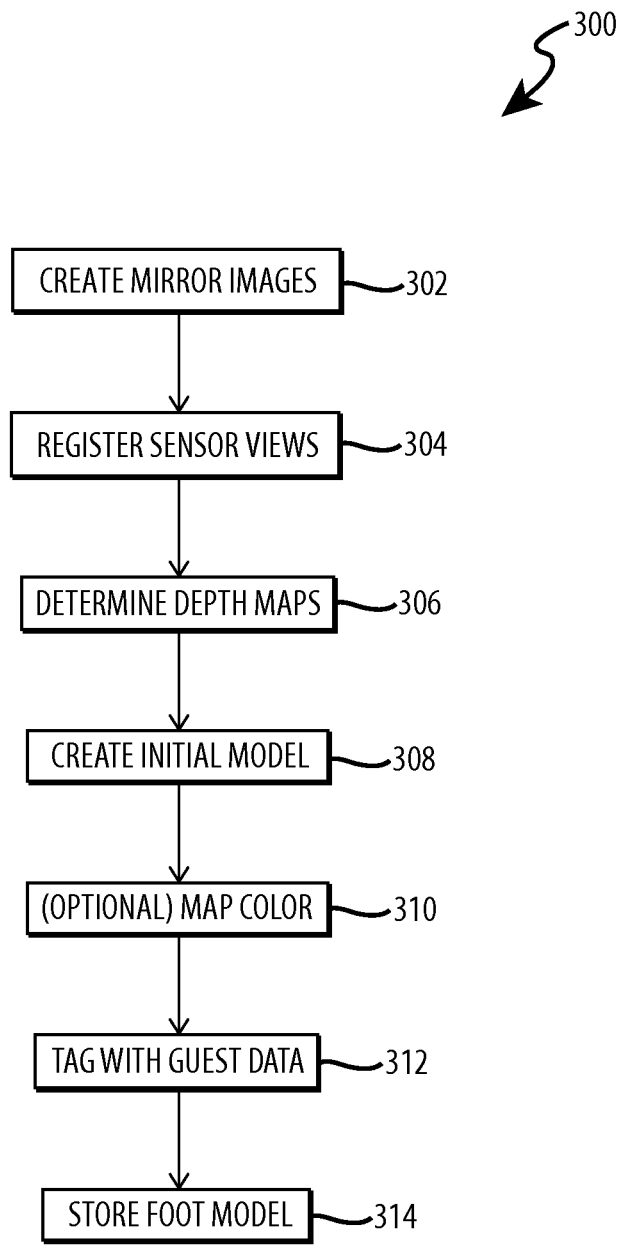
FIG. 5 is a flow chart illustrating a method for generating a foot model using the depth and color images of FIGS. 4A-4C.

FIG. 5 illustrates a flow chart for creating a foot model during the operation 222. With reference to FIG. 4, the method 300 begins with operation 302 and the processing element 150 creates a mirror image for each of the feet 132 in the depth images 182 and color images 180. In particular, in instances where both feet 132 of the guest 108 are captured, a mirror image of both the left foot and the right foot can be created since left and right feet of people are typically symmetrical in shape and appearance. This is especially true when the guests are wearing shoes, as typically people wear matching shoes and the shoes are generally the same size as one another.

To create the mirror images, the processing element 150 identifies the paired left and right feet as discussed in operation 220 and the depth image 182 and the color image 180 are mirrored to create mirror images of each other. For example, the two dimensional images (both color and data) are flipped on an axis, such as a vertical or horizontal axis, to create the mirror images. Once flipped, a 3D transformation is computed that brings the data for the left foot into correspondence with the data for the mirrored right foot. The computation of the 3D transformation is done by finding the correspondence between both the shape information obtained from the depth image, and the surface appearance obtained from the color image. The data for the transformed mirrored right foot is in registration with the data for the left foot, and both sources of data can be combined.

After operation 302, the method 300 proceeds to operation 304. In operation 304 the sensor views and other image data are registered. In one embodiment, the mirrored left foot and right foot created in operation 302 are register to provide data for the foot mode. Additionally, in instances where two or more depth images 182 and/or color images 180 are captured using the method 200 of FIG. 3, the similar types of images can be registered and integrated together. During this operation the processing element 150 integrates shape and appearance data from two or more depth images 182 and/or color images 180 captured at different instances in time. For example, to register the data from the left foot over time, the left foot at two different instances in time (e.g., time t1 and time t2) are detected in the sensor data, and a 3D transformation is computed that brings the data for the left foot at time t1 into correspondence with the data for the left foot at time t2. The computation of the 3D transformation is done by finding the correspondence between both the shape information obtained from the depth image, and the surface appearance obtained from the color image. The data for the transformed left foot at time t1 is in registration with the data for the left foot at time t2, and both sources of data can be combined.

The system 100 allows the depth data and/or color data from the respective depth image 182 and color image 180 to be registered since the images include images of a guest's foot 132. Feet are typically near-rigid shapes, especially when a person is standing and not walking/moving, which is the likely position and orientation of a person while at the acquisition stations 102, 120. In particular, while the toes and sole may flex during walking or running, the feet of a person are usually in a non-flexed state when standing and to the extent a person may be flexing his or her foot, the amount of flex is generally limited. Because the feet 132 are near-rigid objects, the processing element 150 can treat the feet 132 as a close approximation to a fully rigid object and so the multiple time instances can be registered and integrated together (i.e., combined together to create a single depth image 182 with data from multiple images).

During the registration operation 302, the processing element 150 evaluates the depth images 182 and/or color images 180 and omit any images in which the foot or feet are not fixed, flexed, or otherwise varied from other images. By removing images in which the foot may not approximate a near rigid object, the method 300 may be increased to allow more efficient performance and a quicker evaluation of a person's feet.

Once the depth and color data is registered in operation 304, the method 300 proceeds to operation 306 and the processing element 150 determines the depth maps. For example, the processing element 150 may evaluate the depth image 182 and use the initial light pattern projected onto the guest's feet 132 to determine the depth location of the features captured within the depth image. The processing element 150 uses changes between the projected light pattern and the image of the projected light pattern as projected onto the guest's feet to determine the depth location of a plurality of points on the feet 132 relative to the foot sensor 104.

With reference to FIG. 5, after operation 306, the method 300 proceeds to operation 308 and the initial guest foot model is created. In particular, the processing element 150 uses depth and/or color data (including registered data) to generate a 3D representation or model for each of the feet 132, e.g., generate a mesh of triangles representing the shape of the object. The 3D representation corresponds to the shape of the foot, the size of the foot, as well as the topography of the foot. In one embodiment, a single foot model is created for the pair of feet. In particular, by registering the data from the pair of feet to a single image based on the assumption that the feet are symmetrical to one another, a single foot model may be created. The processing element 150 may choose to create either a left or a right foot model, the choice may be arbitrary or may be driven based on the foot with the most comprehensive data (e.g., data with the fewest occlusions). Further, each new sensor view 302 (e.g., different depth images 182 or color images 180 captured at different times or locations) can be integrated into the single foot model to update the model with new information. As the system 100 can integrate data for both the left and right foot of a guest 108, even data taken at multiple time instances, into a single 3D foot model, fewer data points (e.g., depth images 182 and/or color images 180) are needed to be captured and those captured are more reliable. This type of approach is not possible with conventional human identification method such as facial recognition as a person's facial expressions would need to be factored out to create such a model, which would consume excessive amounts of time and processing power and would not produce reliable results.

After operation 308, the method 300 proceeds to operation 310. In operation 310, the processing element 150 maps color data onto the foot model. For example, the processing element 150 may extract color data from the one or more color images 180 and apply that data to the foot model. Examples of color data include the color of the laces 13, the color of the lower leg 130 (e.g., blue pants, denim, etc.), shoe color or pattern, or the like. This color addition provides another data set that can be compared to the database during the reacquisition stage. The color mapping operation 310 may be used when many guests are expected to be enrolled using the acquisition stations 102, 120 and can provide an additional data set to distinguish a particular guest from another guest with a similar brand shoe and size. Further, the color mapping operation may help to expedite the matching processing during reacquisition as will be discussed in more detail below. When a triangle mesh is used, the color data and surface texture is mapped to each triangle.

With reference again to FIG. 5, after operation 310, the method 300 proceeds to operation 312. In operation 312, the foot model is tagged with guest data. The guest data may include various types of information such as name, hometown, residential town, favorite amusement park ride, favorite character, names of family members (e.g., children), favorite food, and so on. The types of guest data are determined on the application for the acquisition stations 102, 120 and may be used to create a customized guest experience and so may be tailored to provide interactions that are personalized to that guest.

With reference to FIG. 1, the guest data may be input by the interaction character 106, 124 for the acquisition stations 102, 120, using the input/output interface 154. In a first example, the interaction character 106 is a human, such as an employee, and the character 106 speaks to the guest 108 and any other people with the guest) and then uses a keyboard, touch screen, mouse, or the like, to enter the guest data into the computing device 160. In a second example, the interaction character 124 is a robot or other non-human device and utilizes one or more sensors to enter the guest data to the computing device 160 (e.g., the robot may record a guest answer with a microphone). In a third example, the guest 108 may enter the guest data directly into the computing device 160 such as through an input mechanism (e.g., keyboard, touch screen).

Once the foot model is tagged with the guest data in operation 312, the method 300 proceeds to operation 314. In operation 314 the foot model, including the guest data, is stored in the memory 152 in the database 112.

Using the method 300 of FIG. 5, a foot model for a guest 108 is created using the acquisition stations 102, 120 of the system 100. The foot model includes the 3D mesh information of a guest's foot, as well as optional color data including the color of a guest's foot (e.g., shoe 134, laces 136, etc.), as well as the color data for the guest's leg, such as the color of his or her pants, socks, or the like.

During the acquisition phase, the foot model for a particular guest is created and stored in the database 112. The system 100 also is used during a reacquisition phase when a guest who has already been modeled by the system 100 is re-evaluated. For example, the first acquisition station 102 may positioned at an entrance to a particular attraction, ride, or at an entrance to the amusement park and when the guest 108 enters the attraction or ride he or she enrolls with the system 100. For example, using the methods 200, 300 of FIGS. 3 and 5 the acquisition station 102 creates a foot model and guest information corresponding to the foot mode and stores the foot and guest data in the database 112. When the guest 108 exits the attraction, enters a new attraction, sits in a ride, moves to a different location with the amusement park, or the like, the guest 108 may approach the second acquisition station 120. In this example, the acquisition station 120 may generate the foot model of the guest, but then may proceed to compare the created foot model to those stored in the database 112 and/or may compare the foot model, such as shoe information, to shoes or products stored in the database 112 and provide a customized interaction with the guest 108 based on a match with a stored model. For example, the guest may be wearing shoes that are sold by a company operating the theme park and the shoe information may be compared to those shoes that are sold by the company and during the customized interaction, the guest may be complimented on his or her shoes.

Figure 6:
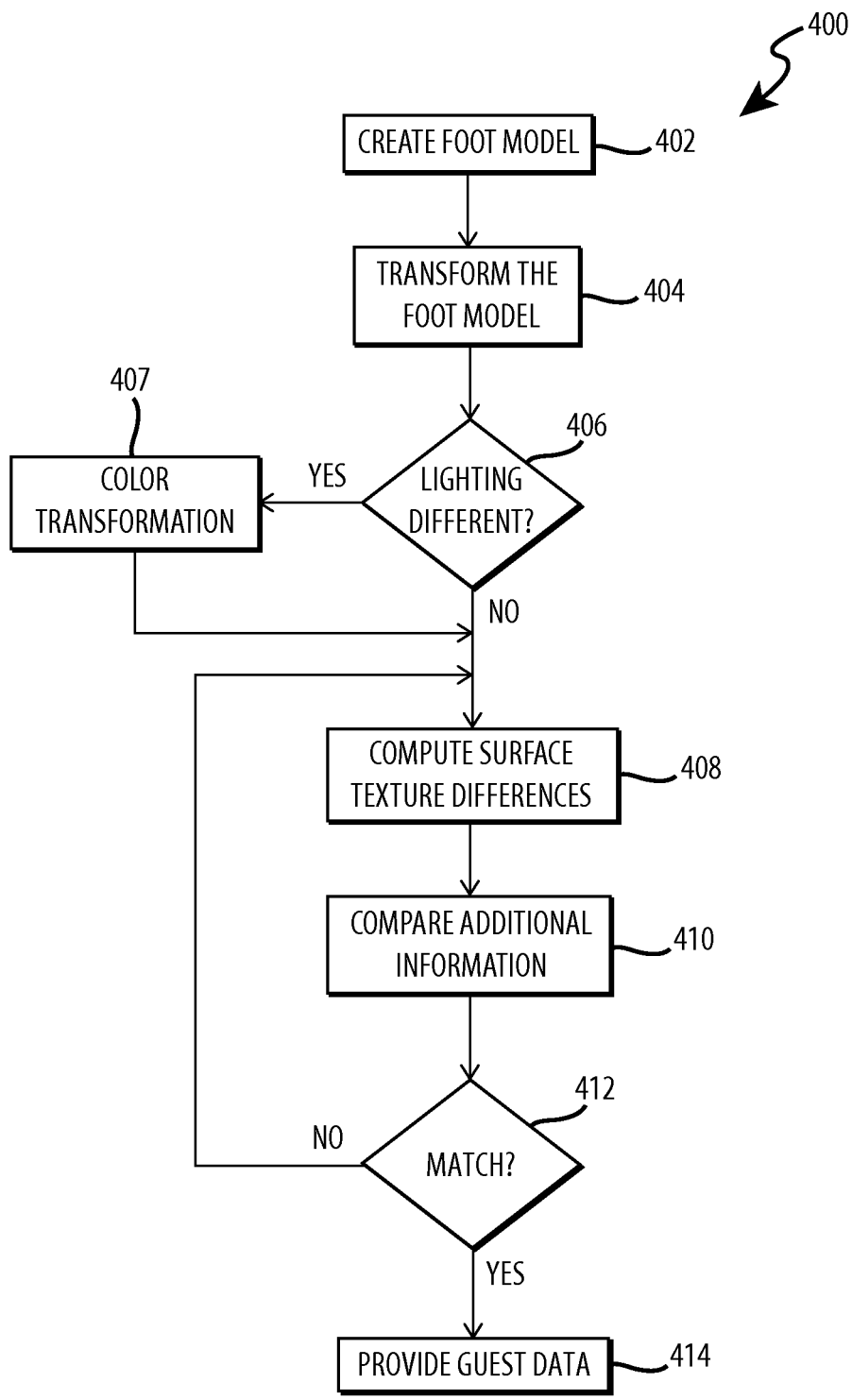
FIG. 6 is a flow chart illustrating a method for comparing a foot model generated using the method of FIG. 5 to one or more foot models stored in a database of the system of FIG. 1.

FIG. 6 illustrates a flow chart of a reacquisition method for matching a guest with a foot model stored in the database 112. With reference to FIG. 6, the method 400 may begin with operation 402. In operation 402, a foot model for a guest 108 is created using the methods 200, 300 of FIGS. 3 and 5. In many embodiments the foot model creation for a reacquisition phase may be substantially the same as the acquisition phase and may be performed by either or both of the acquisition stations 102, 120.

Once the foot model has been generated, the method 400 proceeds to operation 404 and the processing element 150 transforms the foot model. For example, a 3D transformation between the captured foot model and those models in the database 112 to bring the captured model into registration with the foot models in the database 112, as discussed above.

After operation 404, the method 400 proceeds to operation 406 and the lighting for the captured foot model is evaluated to determine if the lighting is different from those models stored in the database 112. For example, in instances where the lighting element 118 was not activated or different environmental characteristics, the guest's foot information acquired by the foot sensor 104 and camera 105 may be lighted differently from the feet used to create the foot models in the database 112 and the difference in lighting may affect the matching process. When the lighting is different or otherwise needs to be adjusted, the method 400 proceeds to operation 407. In operation 407, the processing element 150 computes a color transformation between the captured foot model and those stored in the database 112 to bring the colors into registration. In other words, the images are modified to account for the lighting differences, such as increasing or decreasing the light intensity (e.g., adjust pixels in the images based on intensity). Additionally or alternatively, a color mapping may be completed in instances where one set of images was captured under a blue light and the second set of images was captured under a green light. In these examples, the processing element 150 will pick corresponding points in the two set of images and map to determine a color falling between the two sets of images and use that color to assess the two sets of images.

With continued reference to FIG. 6, after the color transformation in operation 407 or when a color transformation is not needed, the method 400 proceeds to operation 408. In operation 408, the processing element 150 calculates the surface texture differences between the foot model and those in the database 112. For example, the processing element 150 may use a 3D template matching to compute the differences between the captured foot model and those stored in the database 112. In other words, the foot model is compared to the two or more foot models stored in the database 112 that were previously enrolled by the acquisition stations 102, 120. The processing element 150 may compare the difference in surface textures of the two models using a 3D template matching which may provide a percentage or other numerical assessment of the match between the captured or evaluated model and those stored in the database 112. In these examples, the system 100 may have predefined "match" values that can be used to determine whether a foot model is a match.

A surface texture or appearance matching process allows the system to more accurately determine whether a match is present as the foot information is more accurately represented. The surface texturing is possible due to the near-rigidity assumption used to create the foot model that creates a more detailed data map that is used to complete the 3D foot model. In particular, in conventional matching or identification processes cannot use a point by point comparison as it will be inaccurate as the model may be incomplete due to occlusions or variations in the captured data over time. For example, with a ten point matching process used to identify a person using his or her clothing at different instances in time, the person will likely be in different poses and out of alignment and so a point by point comparison would fail as the points would not match. Therefore, typical systems reduce the clothing appearance down to a histogram of colors so that even when the person is in a different position the colors can be used to identify the person. However, when used for multiple people, the broad histogram of colors for one person will likely match with multiple different other people and so does not work to identify individuals.

On the contrary, due to the rigidity of the foot, a template matching method can be used, which not only increases the accuracy of the model, but also decreases the amount of time and processing power needed to generate the foot model. In other words, although the acquisition and reacquisition data may be captured at different viewing angles, lighting arrangements, or positions of the feet, the feet are substantially rigid and a template matching can be used that accurately matches point by point on the surface texture of the feet, providing a reliable and quick matching process that will work to identify an individual out of a group or multiple people. As a specific example, the histogram matching processes usually compare hundreds of points to determine a match which loses a lot of information, whereas the method of the current disclosure can match tens of thousands of points, ensuring reliability of identification.

During or after operation 408, the method 400 proceeds to operation 410 and the processing element 150 may compare additional information, such as a color mapping, of the evaluated foot model with the already stored models. After operation 410, the method 400 proceeds to operation 412 and the processing element 150 determines whether there is a match between the evaluated foot model and at least one foot model into the database 112.

When a match is not detected the method 400 may return to operation 408 and continue to compare the evaluated foot model with those stored in the database 112. When a match is detected, the method 400 proceeds to operation 414 and the guest data is used to provide a customized interaction with the guest 108. For example, the interaction character 106, 124 at the acquisition statin 102, 120 may refer to a guest 108 by his or her name, ask whether the last ride he or she rode was fun, provide facts or information about a guest's favorite character, or so on. As another example, the acquisition station 102, 120 may be mounted to a ride vehicle and acquisition is completed while the guest is seated, such as the guest is enjoying the ride. When the ride is completed, the acquisition station 102, 120 can identify the guest in a particular seat and automatically provide content (e.g., photograph, video, etc.) to the guest (e.g., sending the content via email to an email address provided by the guest, associating the content with the guest's name at a pickup location, or the like).

Using the acquisition stations 102, 120 and the methods shown in FIGS. 3, 5, and 6, guests 108 can be more easily identified at different locations within a venue, providing opportunities for a customized guest experience. Because the matching and identification processes use foot data of the guests, the foot sensor can be located at a low level (e.g., below a guest's knees) and are therefore easier to conceal or blend in with certain surroundings. Moreover, as the sensor can be angled towards the ground, the background for the depth images 182 and/or color images 180 will be known and easier to remove the foot data from the images.

The foot model data captured with the system provides an enhanced reliability of identification and data capture as compared to conventional identification methods such as iris scanning or facial recognition. This is because facial and iris identification methods typically require an obstructed view of a person's face, but while at an attraction park, guests may wear hats, caps, sunglasses, and/or move their heads during interaction with a capture element, preventing capture of a non-occulted data set. In contrast, feet are not typically covered and people are typically unlikely to stand in a pose with their feet in a way that obstructs a view of the surface of the foot. Additionally, people are unlikely to change their shoes while at an amusement park, whereas hats, sunglasses, jackets, and so on, may be changed during the time at the amusement park.

Also, as the system utilizes foot data to identify guests, guests may be less reluctant to be enrolled in the system 100 as compared to conventional identification methods. For example, some people have sensitivity to using personal biometrics, such as iris or facial scans, for identification purposes.

Further, as the foot data includes both the foot appearance and the foot shape, it is possible to minimize the effect of different viewing angles or perspective effects in the foot data, which typically degrade the recognition process. Due to the rigidity of the foot while a person is standing, the system can obtain invariance to the specific physical relationship between the sensor and the foot (or shoes).

CONCLUSION

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A system for guest awareness in a venue comprising:
at least one acquisition station including at least one sensor for detecting a three-dimensional shape and a visual appearance of a foot; and
a computing device in communication with the at least one acquisition station, wherein the computing device is configured to perform the following operations:
receive a first set of foot data from the at least one sensor of the at least one acquisition station, wherein the first set of foot data includes data corresponding to both a three-dimensional foot shape and a foot appearance;
generate a first foot descriptor using the first set of foot data, wherein the first foot descriptor corresponds to a first person and is three-dimensional model of a first foot of the first person; and
store the first foot descriptor in a database; wherein the first foot descriptor is used to provide a personalized guest experience to the first person.

2. The system of claim 1, wherein the computing device is configured to perform the following operations:
receive a second set of foot data from the at least one sensor of the at least one acquisition station, wherein the second set of foot data includes data corresponding to both a foot shape and a foot appearance;
generate a second foot descriptor using the second set of foot data; and
compare the second foot descriptor to the first foot model to determine if the second set of foot data corresponds to the first person, wherein when the second set of foot data corresponds to the first person, providing the personalized quest experience to the first person.

3. The system of claim 2, wherein the compare operation comprises comparing a first surface texture of the first foot descriptor to a second surface texture of the second foot descriptor.

4. The system of claim 3, wherein the compare operation further comprises comparing a first shape of the first foot descriptor to a second shape of the second foot descriptor.

5. The system of claim 1, wherein the generate operation comprises:
creating a mirror image of a first foot illustrated in the first set of foot data.

6. The system of claim 1, wherein the generate operation comprises:
integrating a first time foot image captured by the at least one sensor at a first instance in time with a second time foot image captured by the at least one sensor at a second instance in time into a single three-dimensional representation to generate the first foot descriptor.

7. The system of claim 1, wherein the at least one acquisition station is a dual purpose station and enrolls a guest foot descriptor into the database and compares a guest foot descriptor to the first foot descriptor stored in the database.

8. The system of claim 1, wherein the at least one acquisition station comprises a first station and a second station.

9. The system of claim 1, further comprising an interaction host, wherein the interaction host inputs guest data into the computing device.

10. The system of claim 9, wherein the interaction host is a robot.

11. The method of claim 1, wherein the first set of foot data comprises a right foot image and the generate operation further comprises:
creating a mirror image of a left foot using the right foot image;
computing a three-dimensional transformation to correspond the mirrored left foot image with the first set of foot data to generate left foot data; and
integrating the left foot data into the first foot descriptor.

12. The method of claim 1, wherein the first set of foot data comprises a plurality of foot images of the foot and the generate operation further comprises:
evaluating the plurality of foot images to determine if the foot was fixed when each respective foot image was captured by the at least one sensor; wherein
when the foot was not fixed, discarding the respective foot image; and
when the foot was fixed, using the respective foot image to generate the first foot descriptor.

13. The method of claim 1, wherein the first set of foot data comprises one or more foot images illustrating the foot appearance and the generate operation further comprises:
extracting color data from the plurality of foot images; and
applying the color data to the three-dimensional model of the first foot to create the first foot descriptor.

14. A method for creating a customized guest experience at an amusement park comprising:
capturing a first foot three-dimensional shape corresponding to at least one foot in a pair of feet of a guest;
capturing a first foot appearance corresponding to at least one foot in the first pair of feet;
receiving guest data from the guest;
generating by a processing element a first foot model using the first foot three-dimensional shape and the first foot appearance, wherein the first foot model is a three-dimensional model of the at least one foot;
tagging by the processing element the first foot model with the guest data; and
outputting a customized experience to the quest based on an identification of the guest using the first foot model.

15. The method of claim 14, wherein the first foot shape is captured by a foot sensor and the first foot appearance is captured by a camera.

16. The method of claim 15, further comprising:
capturing by the foot sensor a second foot shape corresponding to at least one foot in a pair of feet of a guest;
capturing by the camera a second foot appearance corresponding to at least one foot in the first pair of feet;
generating by the processing element a second foot model using the second foot shape and the second foot appearance; and
comparing by the processing element the second foot model to the first foot model.

17. The method of claim 16, wherein the customized experience the guest is output when the second foot model matches the first foot model using the guest data.

18. The method of claim 17, wherein the customized experience is providing a media content to the guest.

19. The method of claim 15, wherein the foot sensor and the camera are connected to an acquisition station.

20. The method of claim 19, wherein the acquisition station is movable around a portion of the amusement park.

21. The method of claim 14, wherein the first foot shape and the first foot appearance are captured while the guest is standing.

22. The method of claim 14, wherein the first foot shape and the first foot appearance are captured while the guest is sitting.

23. A robot for interacting with guests at an amusement park, comprising:
a foot sensor for capturing a first depth image of at least one foot of a guest during a first interaction and capturing a second depth image of the least one foot during a second interaction;
a camera for capturing a first color image of the least one foot of the guest during the first interaction and capturing a second color image of the at least one foot during the second interaction;
a computing device in communication with the foot sensor and the camera, wherein the computing device uses the first depth image and the first color image to generate a three-dimensional foot representation of the at least one foot of the guest;
an input/output interface for receiving guest information from the guest during the first interaction; wherein
during the second interaction, the computing device recognizes the guest based on a comparison of the second depth image and the second color image with the foot representation; and
the input/output interface outputs to the quest a customized quest experience based on the guest information.

24. The robot of claim 23, further wherein the computing device uses the second depth image and the second color image to generate a second foot representation corresponding to the guest, wherein during the second interaction the computing device compares the first foot representation with the second foot representation to recognize the guest.

25. The robot of claim 23, wherein the guest information includes at least one of a guest name, favorite character, favorite food, hometown, and/or favorite ride.

* * * * *